UNITED STATES PATENT OFFICE.

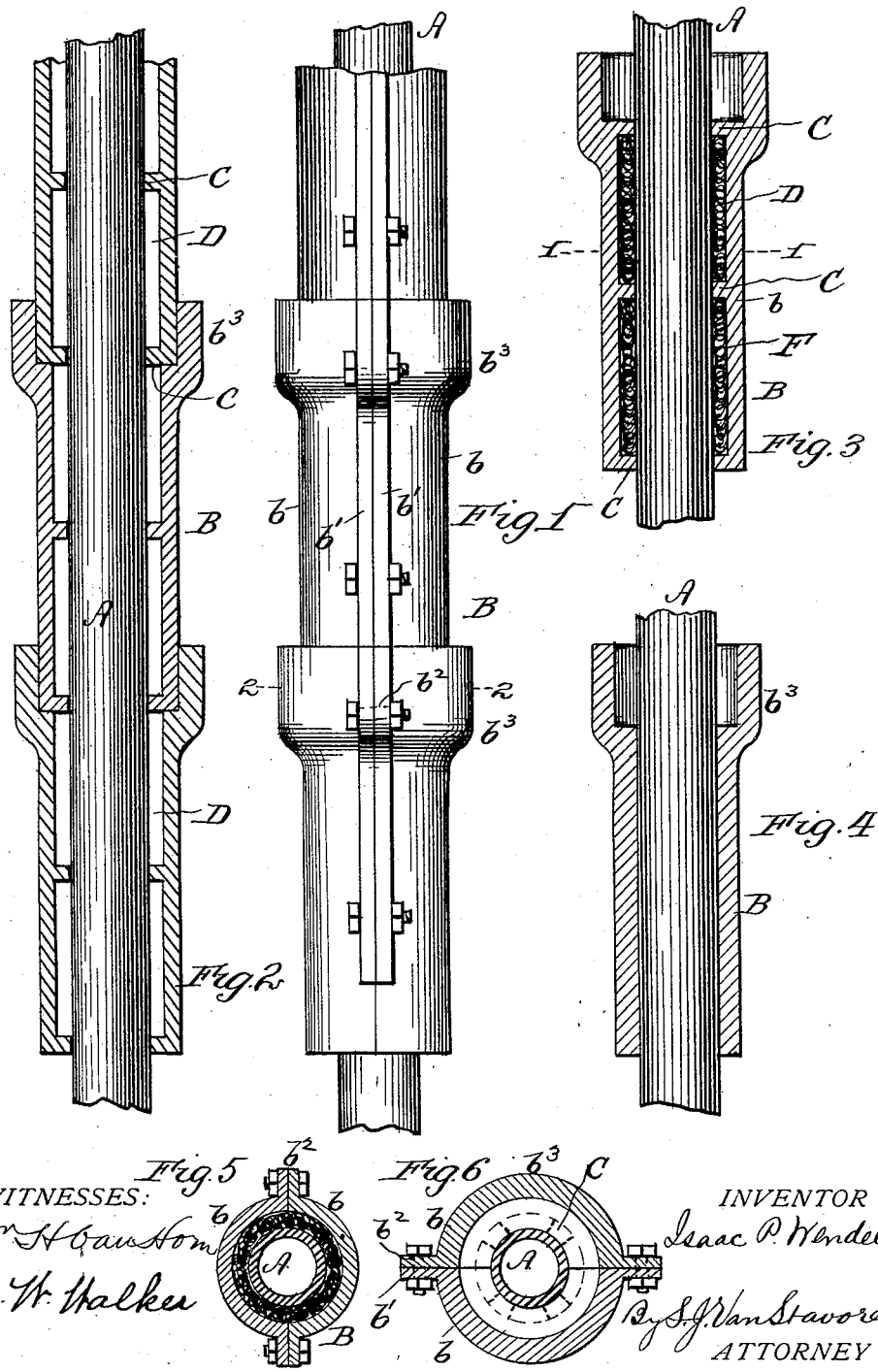

ISAAC P. WENDELL, OF PHILADELPHIA, PENNSYLVANIA.

PIPE-COVERING.

SPECIFICATION forming part of Letters Patent No. 411,115, dated September 17, 1889.

Application filed October 2, 1888. Serial No. 286,974. (No model.)

*To all whom it may concern:*

Be it known that I, ISAAC P. WENDELL, a citizen of the United States, residing at Philadelphia, in the county of Philadelphia and State of Pennsylvania, have invented certain new and useful Improvements in Non-Conductor Coverings for Steam-Pipes, of which the following is a specification.

My invention has relation to that form of non-conducting coverings for steam, hot-air, or analogous pipes wherein the coverings consist of semi-cylindrical shells or sections so constructed that when applied to the pipes an air-space is provided or formed between the pipes and the non-conductor covering; and it has for its object simplicity of construction of the shells or sections, so that they can readily be affixed to the pipes and correspondingly removed, and which are composed of a compound having asbestos and a suitable indurating material as a basis to provide for the shells or sections being rigid without being frangible.

My invention accordingly consists of the combinations, constructions, and arrangements of parts, as hereinafter described in the specification, and pointed out in the claims.

Reference is had to the accompanying drawings, wherein Figure 1 is an elevation of part of a line of pipe and non-conductor covering therefor embodying my improvements. Fig. 2 is a like view showing the covering in longitudinal section and the air-spaces between the pipe and covering. Fig. 3 is a like view showing the air-space filled up with loose asbestos or other non-conducting material. Fig. 4 is a similar view showing the air-space between pipe and covering dispensed with. Fig. 5 is a section on line 1 1, Fig. 3; and Fig. 6 is a like section on line 2 2, Fig. 1.

A represents a line of steam, hot-air, or other like pipe, and B the non-conducting covering therefor, which is composed of lengths of semi-cylindrical shells or sections $b\ b$, having edge flanges $b'$, with, preferably, bolt-openings $b^2$ and bell-mouth ends $b^3$, by means of which the sections are secured to the pipes and flange-bolted together. In the bore of the sections are formed projecting transverse longitudinal or spirally-arranged ribs, lugs, pins, or other like projections C, to form a space D between the pipe A and its covering B, which serves as an air-space, if desired, to enhance the efficiency of the covering. The projections C in the bore of sections $b\ b$ may be so arranged in relation to the coupling ends $b^3$ of the pipes that the air-spaces D for the lengths of covering-sections do not intercommunicate, as shown in Fig. 3, in which case the projections C are in the form of semicircular transverse ribs. By making the projections C in the form of pins or lugs either transversely, horizontally, or otherwise arranged, as indicated in Fig. 6, however, said air-spaces will intercommunicate with one another. In any case the air spaces or chambers D between the pipe and covering do not communicate with the external air.

If desired, the spaces or chambers D may be filled with loose or flock asbestos or other suitable non-conducting material, as indicated at F, Fig. 3, to still further enhance the efficiency of the non-conducting covering.

The non-conductor sections $b\ b$ are made of asbestos combined with any suitable indurating material as a base to make the non-conductor coverings or sections comparatively stiff, inflexible, or hard, so that when flange-bolted together they will not crack or otherwise become impaired; but, if desired, the material employed to combine the basic ingredients may be such that the covering-sections, while flexible to a greater or less extent, yet are sufficiently tough in texture to prevent cracking when bolted together.

If desired, the lugs C may be dispensed with, in which case the sections are in contact with the pipe and said air-space is dispensed with, as indicated in Fig. 4.

If desired, any other suitable fastening may be substituted for the flange-and-bolt connection herein described.

What I claim is—

1. A non-conductor covering for steam-pipes or analogous fixtures, composed of semi-cylindrical sections or shells having a bell-mouth at one end and edge flanges, and bolt-and-nut connections passing through said edge flanges, substantially as set forth.

2. A non-conductor covering for steam-pipes or analogous fixtures, consisting of semi-cylindrical sections or shells having at one end a bell-mouth and composed of asbestus and an indurating material as a base, substantially as set forth.

3. A non-conductor covering for steam-pipes and analogous fixtures, consisting of rigid semi-cylindrical sections or shells having at one end a bell-mouth and lugs or ribs C in their bore, and composed of asbestus and an indurating material as a base, substantially as set forth.

4. The rigid semi-cylindrical sections or shells $b$, having at one end a bell-mouth, lugs C in their bore, and a filling of loose asbestus between said lugs and said sections, consisting of asbestus and an indurating material as a base, substantially as and for the purpose set forth.

In testimony whereof I affix my signature in presence of two witnesses.

ISAAC P. WENDELL.

Witnesses:
S. J. VAN STAVOREN,
CHAS. F. VAN HORN.